(12) United States Patent
Ray

(10) Patent No.: US 6,550,181 B1
(45) Date of Patent: Apr. 22, 2003

(54) ELEVATED BEETLE TRAP

(76) Inventor: Randy D. Ray, 2431 Smalling Rd., Lafayette, TN (US) 37083

( * ) Notice: Subject to any disclaimer, the term of this patent is extended or adjusted under 35 U.S.C. 154(b) by 0 days.

(21) Appl. No.: 09/846,263

(22) Filed: May 2, 2001

Related U.S. Application Data

(60) Provisional application No. 60/211,541, filed on Jun. 15, 2000.

(51) Int. Cl.$^7$ .......................... A01M 1/00; A01M 1/02; A01M 1/10
(52) U.S. Cl. .......................... 43/107; 43/122; 43/132.1
(58) Field of Search .................. 43/107, 122

(56) References Cited

U.S. PATENT DOCUMENTS

| | | | |
|---|---|---|---|
| 1,360,127 A | 11/1920 | McKay | 43/122 |
| 1,787,421 A | 12/1930 | Ruddell | 43/107 |
| 1,971,367 A | 8/1934 | Brooke | 43/107 |
| 3,939,802 A | 2/1976 | Neff | 119/51.04 |
| 4,036,189 A | 7/1977 | Neff | 119/51.04 |
| 4,282,673 A * | 8/1981 | Focks | 43/113 |
| 4,328,636 A | 5/1982 | Johnson | 43/107 |
| 4,476,647 A | 10/1984 | Hall, Jr. | 43/122 |
| 4,706,410 A * | 11/1987 | Briese | 43/107 |
| 4,794,724 A | 1/1989 | Peters | 43/122 |
| 4,944,114 A | 7/1990 | Burton et al. | 43/113 |
| D348,715 S | 7/1994 | Warner | D22/122 |
| D359,790 S | 6/1995 | Blotnick | D22/122 |
| 5,544,621 A | 8/1996 | Haurilesko | 119/230 |
| 6,301,827 B1 * | 10/2001 | Lankster | 43/107 |

FOREIGN PATENT DOCUMENTS

| | | | | |
|---|---|---|---|---|
| DE | 2924629 | * | 1/1981 | 43/107 |
| GB | 752132 | | 7/1956 | |
| GB | 1505294 | | 3/1978 | |
| GB | 2052942 | | 2/1981 | |
| WO | 405015285 A | * | 1/1993 | 43/107 |

OTHER PUBLICATIONS

United States Department of Agriculture, Miscellaneous Publication No. 201, Traps for the Japanese Beetle and How to Use Them, F. W. Metzger, Issued Jun. 1934, Revised Jun. 1938.*

* cited by examiner

*Primary Examiner*—Michael J. Carone
*Assistant Examiner*—H. A. Blackner

(57) ABSTRACT

An elevated beetle trap which includes two interlocking bodies each having a slot formed in a surface thereof. A sex lure is disposed in the slot to attract beetles. The beetles collide with the interlocking bodies and fall to a funnel positioned at the bottom of the interlocking bodies. A bag is removably secured to the funnel to house and transport the trapped beetles.

Conveniently, the trap may be positioned over a body of water so that dead beetles fall into the water for fishfood.

4 Claims, 2 Drawing Sheets

ELEVATED BEETLE TRAP

CROSS-REFERENCE TO RELATED APPLICATION

This application claims the benefit of U.S. Provisional Patent Application Serial No. 60/211,541, filed Jun. 15, 2000.

BACKGROUND OF THE INVENTION

1. Field of the Invention

The present invention relates to an elevated beetle trap, and more specifically, a beetle trap that utilizes bait such as a sex lure for attracting Japanese beetles.

2. Description of Related Art

Insect trapping methods and devices have been utilized for many purposes. For example, some trapping devices are used for capturing insects such as crickets and using them for fishing. Other trapping devices are used to catch insects and then to exterminate them. Still other trapping devices can be hung over a pond or float on a water's surface. These devices trap insects and redirect them to fall into the water to provide food for the fish in the water.

The following design patents illustrate various ornamental designs of insect trapping devices.

U.S. Des. Pat. No. 348,715, issued to William B. Warner on Jul. 12, 1994, identifies an ornamental design of an insect trap. The design includes two cylinders enclosing several cone shaped structures. U.S. Des. Pat. No. 359,790, issued to William P. Blotnick on Jun. 27, 1995, shows an ornamental design of an insect attracting and exterminating unit. The design includes a series of attached cylindrically-shaped members whereby the center cylinder has a plurality of rectangular-shaped apertures.

The following patents describe various types of apparatus and methods that are utilized in trapping insects.

U.S. Pat. No. 1,360,127, issued to T. J. McKay on Nov. 23, 1920, shows a fly trap having removable parts which may be easily and thoroughly sterilized. The device requires a bait tray and is designed to hold water in a bottom portion.

U.S. Pat. No. 1,787,421, issued to William A. Ruddell on Dec. 30, 1930, discloses trap for catching and destroying beetles. The beetles pass into a confining chamber with a bait receptacle within a receptacle. A separate chamber confines the odors of previously caught, decaying beetles.

U.S. Pat. No. 1,971,367, issued to James J. Brooke on Aug. 28, 1934, presents a beetle trap which is adapted to be employed in association with a mason jar. A funnel is secured to the cap and extends inside the jar.

U.S. Pat. No. 3,939,802, issued to Gregor N. Neff on Feb. 24, 1976, shows a device and method for trapping insects from the air and feeding the same to fish. The device includes a light source supported on a floating platform. A funnel is situated beneath the light source. Once the insects are caught, they pass down the funnel and land on the water.

U.S. Pat. No. 4,036,189, issued to Gregor N. Neff on Jul. 19, 1977, shows a device for attracting insects in water and feeding the same to fish or the like. This is a continuation-in-part of the above patent and utilizes UV light.

U.S. Pat. No. 4,328,636, issued to Richard D. Johnson on May 11, 1982, discloses a device and a method for insect control. The device attracts female insects to deposit their eggs on a foraminous barrier assuring wasting of the thus deposited eggs.

U.S. Pat. No. 4,476,647, issued to Howard R. Hall on Oct. 16, 1984, describes a Japanese beetle trap made from a throw-away, two liter plastic bottle. The bottle must be provided with a series of flanges and baffles to prevent entering beetles from escaping.

U.S. Pat. No. 4,794,724, issued to Charles W. Peters on Jan. 3, 1989, is a containment-type insect trap having combination entryway and bait tray elements supported therein. The device may contain both solid and liquid insect bait in its bottom portion.

U.S. Pat. No. 4,944,114, issued to Burton, et al. on Jul. 31, 1990, discloses a fish attractant and bug killer. The device includes a dome cover with two or more nylon cords inserted through holes in the bottom of a shaft which rotates horizontally. The nylon cords then hit the insects, knocking them to the surface of the water.

U.S. Pat. No. 5,544,621, issued to Paul Haurilesko on Aug. 13, 1996, discloses a method and device for feeding live insects to fish. The device includes a container having an opening through which an adult, flightless insect can pass. A tacky substance encircles the opening on the outside of the container. Eggs deposited in the container hatch and the hatchlings fall out of the opening and into the water.

Great Britain Pat. No. 752,132, issued on July of 1956, shows a food dispenser for feeding fish in an aquarium. The device includes a clockwork motor enclosed in a casing.

Great Britain Pat. No. 1,505,294, issued on March of 1978, shows an apparatus for feeding insects to aquatic animals. The apparatus is a floating feeder which includes a tubular frame, a cage, a cover, and a floating ring.

Great Britain Pat. No. 2,052,942 issued on February of 1981, discloses an insect trap having a funnel member leading to an insect retaining receiver. The funnel member is provided with a skirt extending towards the receiver.

All the above cited patents have limitations that produce less than satisfactory results. For example, floating insect trapping devices are prone to sink in stormy weather. Devices that require insects to deposit their eggs only work during the reproductive season of the insects. Traps that require electric power are restricted as to location and are relatively complicated. None of the above inventions and patents, taken either singly or in combination, is seen to disclose an efficient and simplistic beetle trap as will be subsequently described and claimed in the instant invention.

SUMMARY OF THE INVENTION

The present invention is an elevated beetle trap that includes hanging means, two interlocking bodies forming a cross, a top wall, a funnel-shaped bottom wall, a vertically-positioned elongate member, means for holding a sex lure in each interlocking body, and a plurality of small hooks for holding a bag for housing the trapped beetles.

The beetle trap is designed to be suspended from a support such as a branch of a tree or the like. A sex lure is secured into slots formed in each interlocking body. The sex lure attracts beetles which fly into the interlocking bodies, and fall onto the funnel-shaped bottom wall and out through the bottom of the vertically positioned elongate member.

In one scenario, the trap is suspended over a body of water so that the falling beetles drop directly into the water to be consumed by fish. In lieu of this arrangement, a removable bag is attached at the bottom of the elongate member for housing the trapped beetles for later disposal.

Accordingly, it is a principal object of the invention to provide an insect trap, which trap is especially effective in trapping Japanese beetles.

It is another object of the invention to provide an insect trap, which trap is easy to assemble.

It is a further object of the invention to provide an insect trap, which trap incorporates structure for mounting a removable insect lure.

Still another object of the invention is to provide an insect trap, which trap incorporates a removal container for housing and transporting trapped insects.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
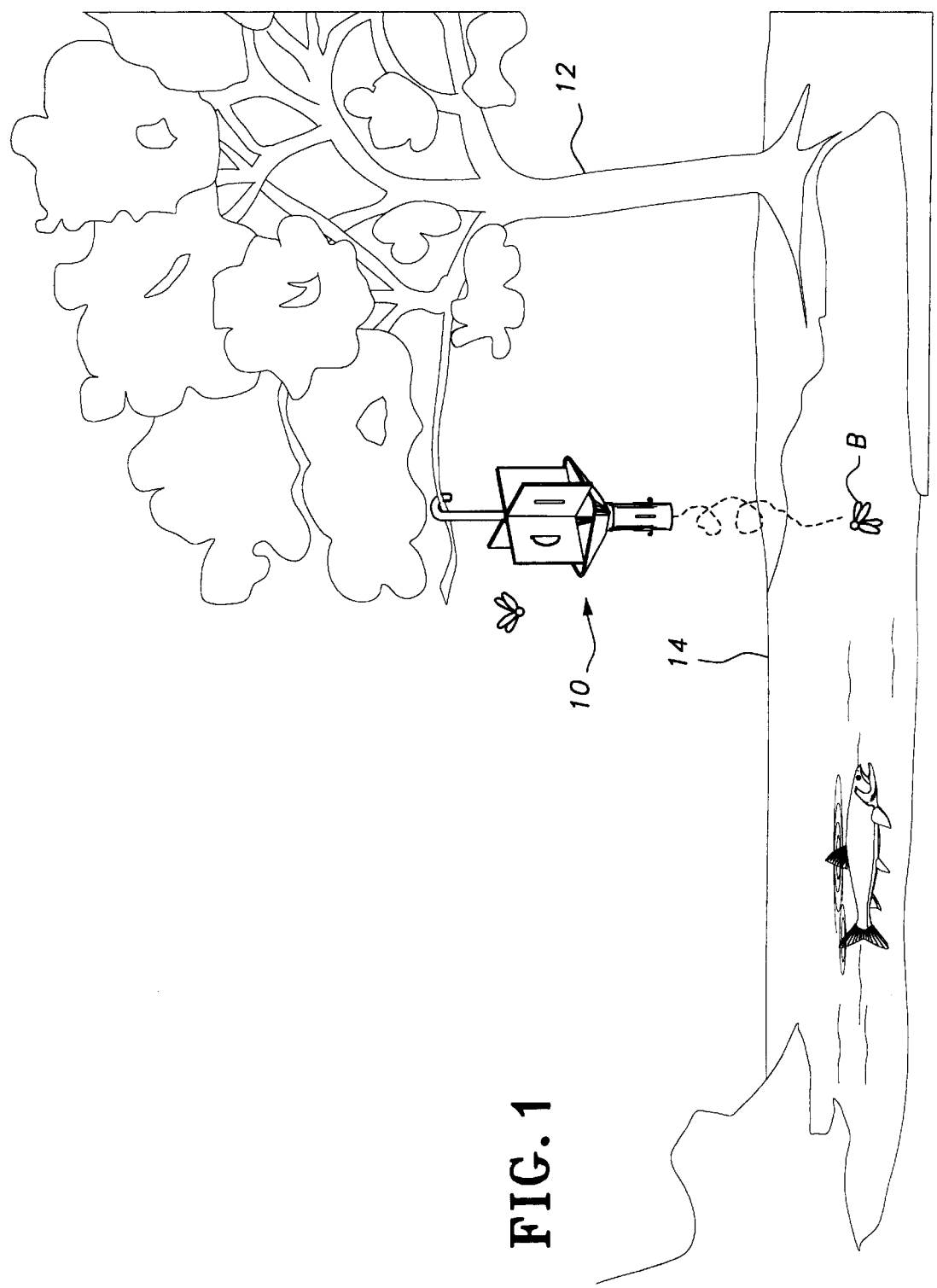
FIG. 1 is a perspective, environmental view of the beetle trap according to the present invention.

The present invention is drawn to an insect (especially Japanese beetles) trap and is generally designated at 10 in the drawings. The beetle trap 10 comprises suspension means, a container having a top wall, two interlocking bodies forming a cross, a funnel-shaped bottom wall, a vertically-positioned elongate member, means for holding a sex lure in the two interlocking bodies, a plurality of small hooks positioned on the elongate member and a bag removably disposed on the hooks.

Attention is first directed to FIG. 1 wherein trap 10 is shown suspended from a tree 12 (or the like) and positioned above a body of water 14. As shown, the trapped beetles B fall from the trap directly into water 14 to be consumed by fish.

Figure 2:
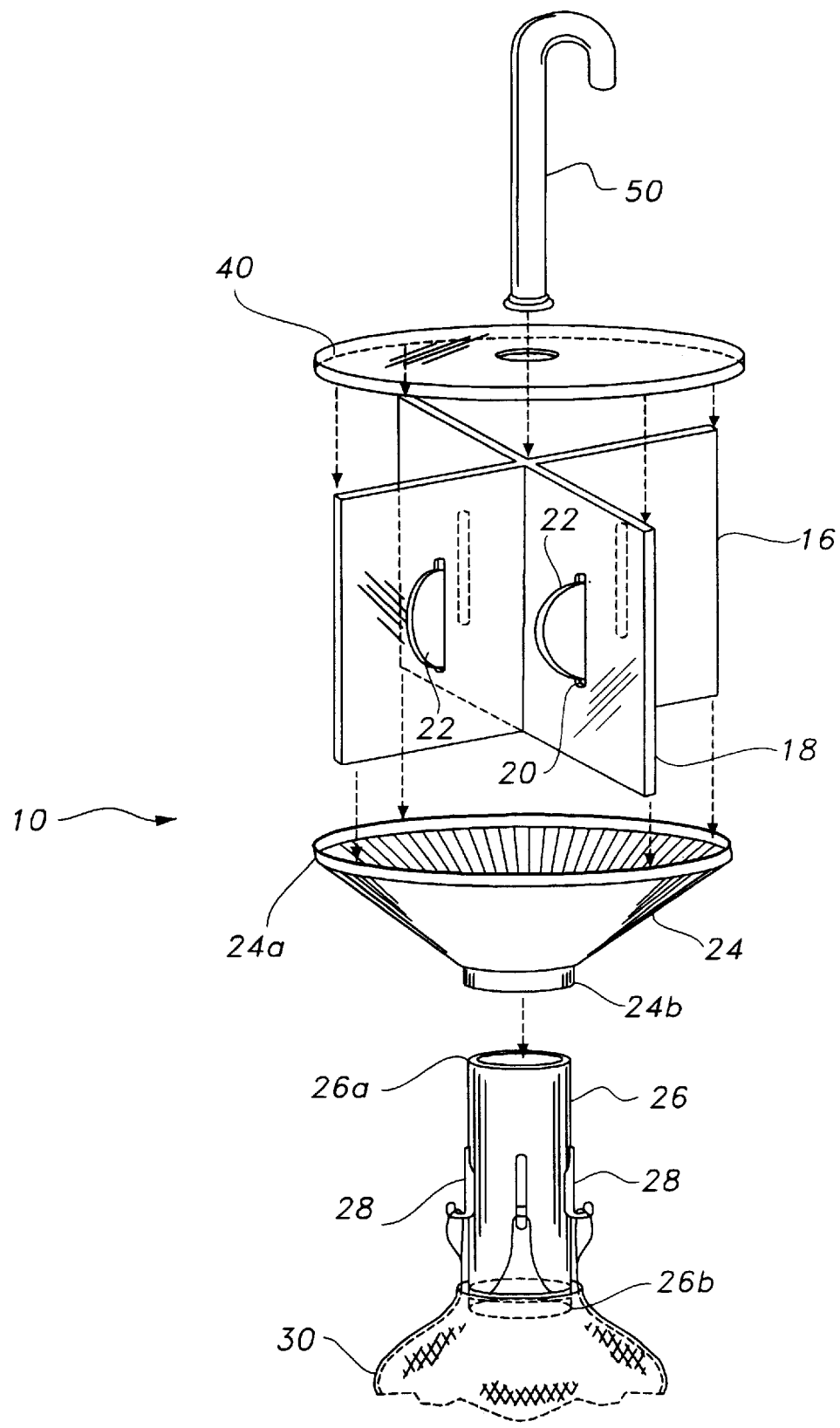
FIG. 2 is an exploded, perspective view of the beetle trap according to the present invention.

As best seen in FIG. 2, trap 10 comprises a pair of thin, rectangularly-shaped members 16, 18. Each member has front and rear planar faces. Members 16 and 18 are arranged so that they bisect each other and are interlocked at right angles. This arrangement may be accomplished in any convenient manner. Slot-like openings 20 are formed in each member 16, 18. Each opening 20 is sized to retain a Japanese beetle sex lure 22. The sex lures 22 are commercially available and are not, per se, part of the inventive concept.

A funnel 24 is defined at its top end by a rim portion 24*a*. The lower end of the funnel terminates in a short cylindrical opening 24*b*. Rim 24*a* is dimensioned to receive and support the lower edges of members 16 and 18 therein.

An elongate tubular member 26 is provided to vertically extend the length of the funnel opening. Member 26 has an upper end 26*a* which is frictionally fitted to funnel opening 24*b*. Member 26 terminates in an unobstructed opening 26*b*. A series of hooks 28 is evenly spaced around the circumference of member 26 and attached thereto. Hooks 28 are positioned upwardly from opening 26*b*. A cloth or plastic bag 30 is removably retained on hooks 28.

A cap 40 may be utilized to provide stability for the trap, if necessary. Use of the cap is optional. Member 50 is provided to suspend trap 10 from a tree limb or the like. Member 50 can be removably attached to members 16, 18 by any conventional and convenient means. An opening is provided in cap 40 to accommodate attachment of member 50 to members 16, 18.

As contemplated, members 16, 18, funnel 24, elongate member 26, cap 40, suspension member 50 and hooks 28 are all fabricated from rust-resistant metal (stainless steel, for example). Alternatively, a plastic material may be made utilized if suitable. Although illustrated as a circular or square configuration, it is obvious that the cap and funnel may be constructed in other configurations if desired.

It is to be understood that the present invention is not limited to the sole embodiments described above, but encompass any and all embodiments within the scope of the following claims.

I claim:

1. A trap for catching beetles and other insects, comprising:

a first planar body having an upper edge and a lower edge;

a second planar body having an upper edge and a lower edge;

said first planar body being positioned in a bisecting, perpendicular relationship with said second planar body;

a funnel member, said funnel member having an open upper end and an open lower end;

an upstanding rim, said rim defining said upper end of said funnel member, said first planar body and said second planar body frictionally attached to said upstanding rim;

at least one slot disposed in said first planar body and at least one slot disposed in said second planar body;

at least two insect lures, each of said two insect lures positioned in the at least one slot of said first planar body and said second planar body for attracting and causing insects to collide with one of said first planar body and said second planar body, whereby insects fall into said funnel member after colliding;

an elongate cylindrical member, said elongate cylindrical member having an outer circumference, a first open end and a second open end, said first open end being frictionally attached to said open lower end of said funnel member, whereby said elongate cylindrical member receives insects falling from the open lower end of said funnel member;

a plurality of hook members, said plurality of hook members being attached to said elongate cylindrical member and evenly spaced around said outer circumference;

a bag having a top opening which envelops said second open end of said elongate cylindrical member, said bag removably attached to said hook members, whereby said bag receives insects falling from said second end of said elongate cylindrical member;

a suspension member, said suspension member attached to said upper edge of said first planar body and said upper edge of said second planar body; and a cap, said cap being frictionally and removably attached to said upper edge of said first planar body and said upper edge of said second planar body.

2. The trap as recited in claim 1, wherein said two insect lures are Japanese beetle sex lures.

3. The trap as recited in claim 2, wherein said first planar body, said second planar body, said funnel, said elongate cylindrical member, said plurality of hook members and said cap are fabricated from a rust-resistant metal.

4. The trap as recited in claim 2, wherein said first planar body, said second planar body, said funnel, said elongate cylindrical member, said plurality of hook members and said cap are fabricated from a plastic material.

* * * * *